(12) United States Patent
Murakami et al.

(10) Patent No.: US 11,035,954 B2
(45) Date of Patent: Jun. 15, 2021

(54) TRANSDUCER

(71) Applicant: FURUNO ELECTRIC CO., LTD., Nishinomiya (JP)

(72) Inventors: Eiji Murakami, Amagasaki (JP); Yasushi Miki, Nishinomiya (JP); Masaaki Tadokoro, Nishinomiya (JP)

(73) Assignee: FURUNO ELECTRIC COMPANY LIMITED, Nishinomiya (JP)

( * ) Notice: Subject to any disclaimer, the term of this patent is extended or adjusted under 35 U.S.C. 154(b) by 502 days.

(21) Appl. No.: 16/164,227

(22) Filed: Oct. 18, 2018

(65) Prior Publication Data

US 2019/0120958 A1    Apr. 25, 2019

(30) Foreign Application Priority Data

Oct. 19, 2017   (JP) ............................. JP2017-202690

(51) Int. Cl.
*G01S 15/89* (2006.01)
*G01S 7/52* (2006.01)
(Continued)

(52) U.S. Cl.
CPC ........ *G01S 15/8954* (2013.01); *B06B 1/0618* (2013.01); *G01S 7/524* (2013.01);
(Continued)

(58) Field of Classification Search
CPC ...... G01S 15/8954; G01S 7/527; G01S 7/524; G01S 7/52019; G01S 7/52077; G01S 7/52053; B06B 1/0618; B06B 2201/74; B06B 1/0207; B06B 1/0603; B06B 1/0607; B06B 1/0611; B06B 2201/55; G01N 29/34
See application file for complete search history.

(56) References Cited

U.S. PATENT DOCUMENTS

2014/0160892 A1   6/2014  Lee et al.
2019/0120958 A1*  4/2019  Murakami ............. G01S 7/524

FOREIGN PATENT DOCUMENTS

| CN | 109682889 A | * | 4/2019 | ......... G01S 7/52077 |
| GB | 2567748 A | * | 4/2019 | ......... G01S 15/8954 |

(Continued)

OTHER PUBLICATIONS

L. J. Augustine et al.; "An Algorithm for the Design of Transformer-less Broadband Equalizers of Ultrasonic Transducers"; J. Acoust. Soc. Am.; Sep. 1979; pp. 629-635; vol. 66, No. 3.

(Continued)

*Primary Examiner* — Daniel Pihulic
(74) *Attorney, Agent, or Firm* — Studebaker & Brackett PC

(57) ABSTRACT

A transducer is provided, which includes an oscillator and a broadbanded matching circuit. In the oscillator, a peak frequency corresponding to a peak transmission sensitivity may separate from a center frequency in a given bandwidth, and a transmission sensitivity may increase as a frequency separates from the peak frequency with respect to the center frequency. The broadbanded matching circuit may be configured to perform an impedance matching so that the transmission sensitivity of the oscillator at the peak frequency becomes substantially equal to the transmission sensitivity of the oscillator at the center frequency.

19 Claims, 7 Drawing Sheets

(51) Int. Cl.
  *B06B 1/06* (2006.01)
  *G01S 7/527* (2006.01)
  *G01S 7/524* (2006.01)

(52) U.S. Cl.
  CPC .......... *G01S 7/527* (2013.01); *G01S 7/52019* (2013.01); *G01S 7/52077* (2013.01); *B06B 2201/74* (2013.01); *G01S 7/52053* (2013.01)

(56) References Cited

FOREIGN PATENT DOCUMENTS

| | | | | |
|---|---|---|---|---|
| JP | H03-179255 | A | 8/1991 | |
| JP | H05-183996 | A | 7/1993 | |
| JP | 2002-159087 | A | 5/2002 | |
| JP | 3702259 | B2 | 10/2005 | |
| JP | 3849513 | B2 | 11/2006 | |
| JP | 4291500 | B2 | 7/2009 | |
| JP | 2019075761 | A * | 5/2019 | ......... G01S 15/8954 |
| WO | 2014/171219 | A1 | 10/2014 | |

OTHER PUBLICATIONS

Search Report under Section 17(5) mailed by the United Kingdom Intellectual Property Office (IPO) dated Jan. 21, 2019, which corresponds to Application No. GB1816117.4 and is related to U.S. Appl. No. 16/164,227.

\* cited by examiner

CONVENTIONAL EXAMPLE

TRANSDUCER

CROSS-REFERENCE TO RELATED APPLICATION(S)

This application claims priority under 35 U.S.C. § 119 to Japanese Patent Application No. 2017-202690, which was filed on Oct. 19, 2017, the entire disclosure of which is hereby incorporated by reference.

TECHNICAL FIELD

The present disclosure relates to a transducer.

BACKGROUND

Conventionally, transducers having an ultrasonic oscillator capable of transmitting and receiving ultrasonic waves are known.

As methods for realizing an ultrasonic transducer with a broader band, there are various methods, such as a method of adding a matching layer, a method of using a BLT oscillator having a configuration in which a front mass is hollow, and a method of using a single-plate oscillator which uses a broadbanded matching circuit. For example, methods disclosed in JP2002-159087A, JPH03-179255A, JPH05-183996A, JP3702259B2, JP3849513B2, and JP4291500B2 are known. Conventionally, it is thought that a relative bandwidth of the transducer which realized the broad bandwidth has only been about 50% at the maximum. Note that the relative bandwidth is defined as (−3 dB attenuation width/center frequency)×100%, using the −3 dB attenuation width as a frequency bandwidth used for detecting an object etc. (a difference between two frequencies of a frequency at the time of peaking capacity and a frequency obtained by attenuated from the peaking-capacity frequency by −3 dB).

For example, if the technique of producing the ultrasonic transducer with the single-plate oscillator which uses the broadbanded matching circuit method is used, a problem that a peak level of an ultrasonic signal drops, and a problem that the technique can only be applied to the single-plate oscillator arise (if the technique is applied to the BLT oscillator, the SE-f characteristic (transmitting sensitivity-frequency characteristic) changes outside the aimed frequency band). Further, for example, if the center frequency is about 38 kHz, it is difficult to produce the transducer with this center frequency from the single-plate oscillator.

Note that an adjustment of the bandwidth is possible to some extent by making the broadbanded matching circuit complex (adding the number of components). However, there are a demerit that the broadbanded matching circuit is physically increased in the size, a demerit that the algorithm is advanced and, thus, the circuit design is difficult, etc.

Moreover, if the technique of adding the matching layer for broadbanding is used, there are demerits that the production of the transducer takes time and efforts, the influence due to a variation in the thickness of the matching layer is large, and only about 50% relative bandwidth is obtained.

Moreover, if broadbanding by making the front mass of the BLT oscillator hollow, there are a demerit that the production of the transducer takes time and efforts, a demerit that only about 50% relative bandwidth is obtained, etc.

SUMMARY

The present disclosure is made in view of the problems described above, and one purpose thereof is to provide a transducer capable of increasing a relative bandwidth.

(1) According to one aspect of the present disclosure, a transducer is provided, which includes an oscillator and a broadbanded matching circuit. In the oscillator, a peak frequency corresponding to a peak transmission sensitivity may separate from a center frequency in a given bandwidth, and a transmission sensitivity may increase as a frequency separates from the peak frequency with respect to the center frequency. The broadbanded matching circuit may be configured to perform an impedance matching so that the transmission sensitivity of the oscillator at the peak frequency becomes substantially equal to the transmission sensitivity of the oscillator at the center frequency.

(2) The broadbanded matching circuit may be comprised of a resistance connected in series with the oscillator, and an inductor connected in parallel with to the oscillator.

(3) The broadbanded matching circuit may be comprised of a resistance and a capacitor that are connected in series with the oscillator, and an inductor and another capacitor that are connected in parallel with the oscillator.

(4) The peak frequency of the oscillator may be set lower than the center frequency.

(5) The oscillator may be a BLT oscillator including a tail mass, and a front mass as an oscillating part.

(6) The weight of the front mass may be less than the weight of the tail mass.

BRIEF DESCRIPTION OF DRAWINGS

The present disclosure is illustrated by way of example and not by way of limitation in the figures of the accompanying drawings, in which like reference numerals indicate like elements and in which.

DETAILED DESCRIPTION

Hereinafter, one embodiment of an underwater detection device 1 having a transducer according to the present disclosure is described with reference to the drawings. The underwater detection device 1 may mainly be to detect target objects, such as fish and a school of fish, and may be fixed to the bottom of a ship, such as a fishing boat, so that it is exposed to the water. In this embodiment, one example is illustrated in which this disclosure is applied to a ship. However, the present disclosure may be applied to any kinds of vehicles having a rudder or a similar steering device, such as other watercrafts including boats, vessels, and submarines, as well as land vehicles, airplanes and spaceships.

[Entire Configuration of Underwater Detection Device]

Figure 1:
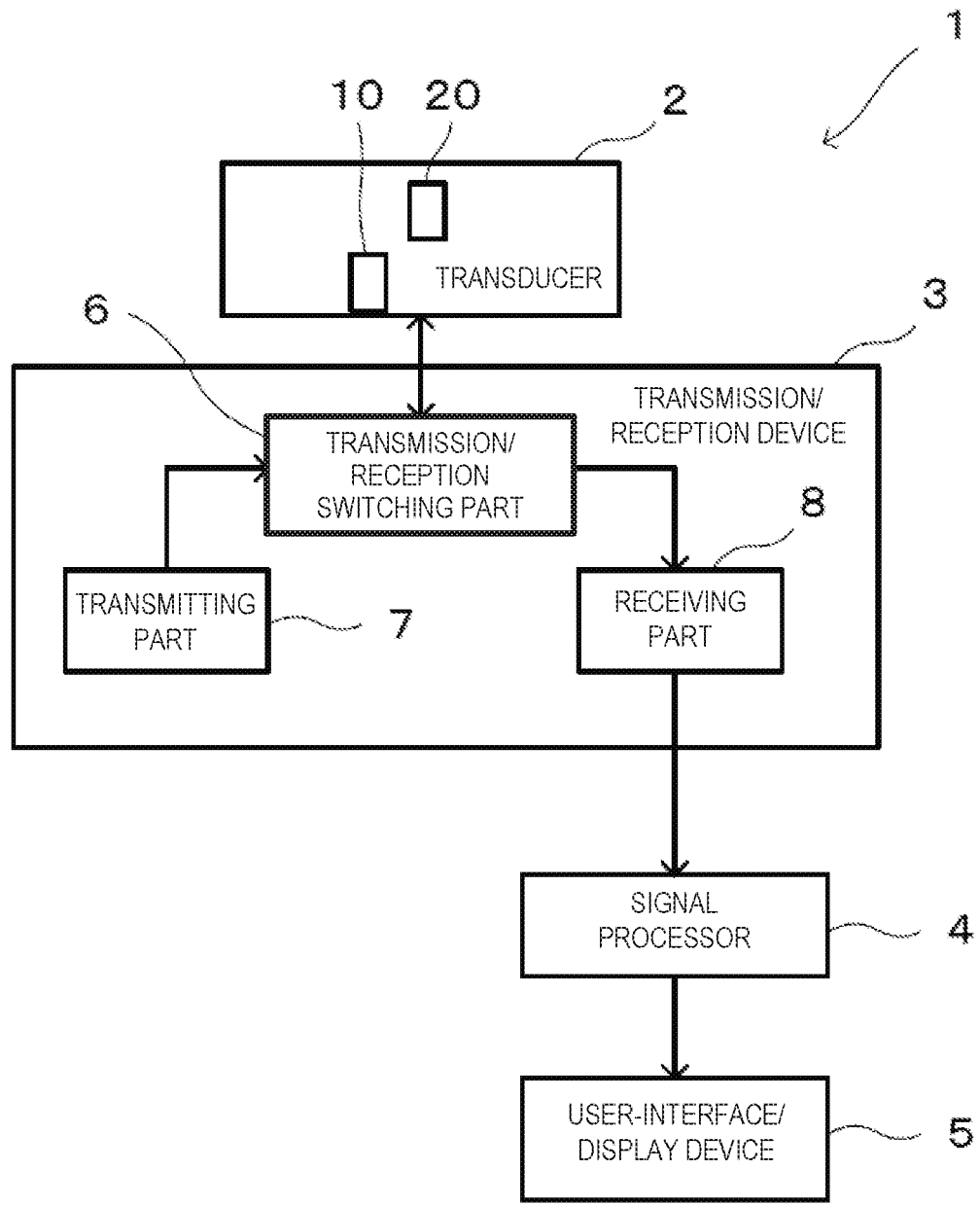
FIG. 1 is a block diagram illustrating a configuration of an underwater detection device according to one embodiment of the present disclosure.

FIG. 1 is a block diagram illustrating a configuration of the underwater detection device 1 according to one embodiment of the present disclosure. As illustrated in FIG. 1, the underwater detection device 1 may include a transducer 2, a transmission/reception device 3, a signal processor 4, and a user-interface/display device 5 (display unit).

The transducer 2 may have a broadbanded matching circuit 10 and an oscillator 20 which is one ultrasonic oscillator. In the transducer 2, the oscillator 20 may transmit an ultrasonic wave converted from an electrical signal to underwater for every given timing, and convert the received ultrasonic wave into the electrical signal. In this embodiment, a center frequency fc of the transducer 2 may be a particular value, and is set to 38 kHz, for example. Note that the center frequency fc of the transducer 2 may suitably be set according to the object to be observed. Details of the transducer 2 will be described later.

The transmission/reception device 3 may include a transmission/reception switching part 6, a transmitting part 7, and a receiving part 8. The transmission/reception switching part 6 may be switched to a connection in which a transmission signal may be sent from the transmitting part 7 to the transducer 2, when transmitting the ultrasonic wave. On the other hand, the transmission/reception switching part 6 may be switched to a connection in which the electrical signal converted from the ultrasonic wave by the transducer 2 may be sent from the transducer 2 to the receiving part 8, when receiving the ultrasonic wave.

The transmitting part 7 may output the transmission signal generated based on a condition which is set in the user-interface/display device 5, to the transducer 2 through the transmission/reception switching part 6.

The receiving part 8 may amplify the signal received by the transducer 2, and carry out an A/D conversion of the amplified reception signal. Then, the receiving part 8 may output to the signal processor 4 the reception data converted into a digital signal.

The signal processor 4 may process the reception data outputted from the receiving part 8, and perform processing of generating an image signal of the target object.

The user-interface/display device 5 may display an image according to the image signal outputted from the signal processor 4 on a display screen. A user may be able to guess the state in the water around the ship (the existence of a single fish, a school of fish, etc.), while watching the display screen. Moreover, the user-interface/display device 5 may be provided with an input device, such as various input keys, and be configured so that transmission and reception of a sound wave, signal processing, or input of various settings or various parameters necessary for the displaying of the image, etc. may be possible.

[Characteristics Required for Oscillator and Broadbanded Matching Circuit]

Figure 2:
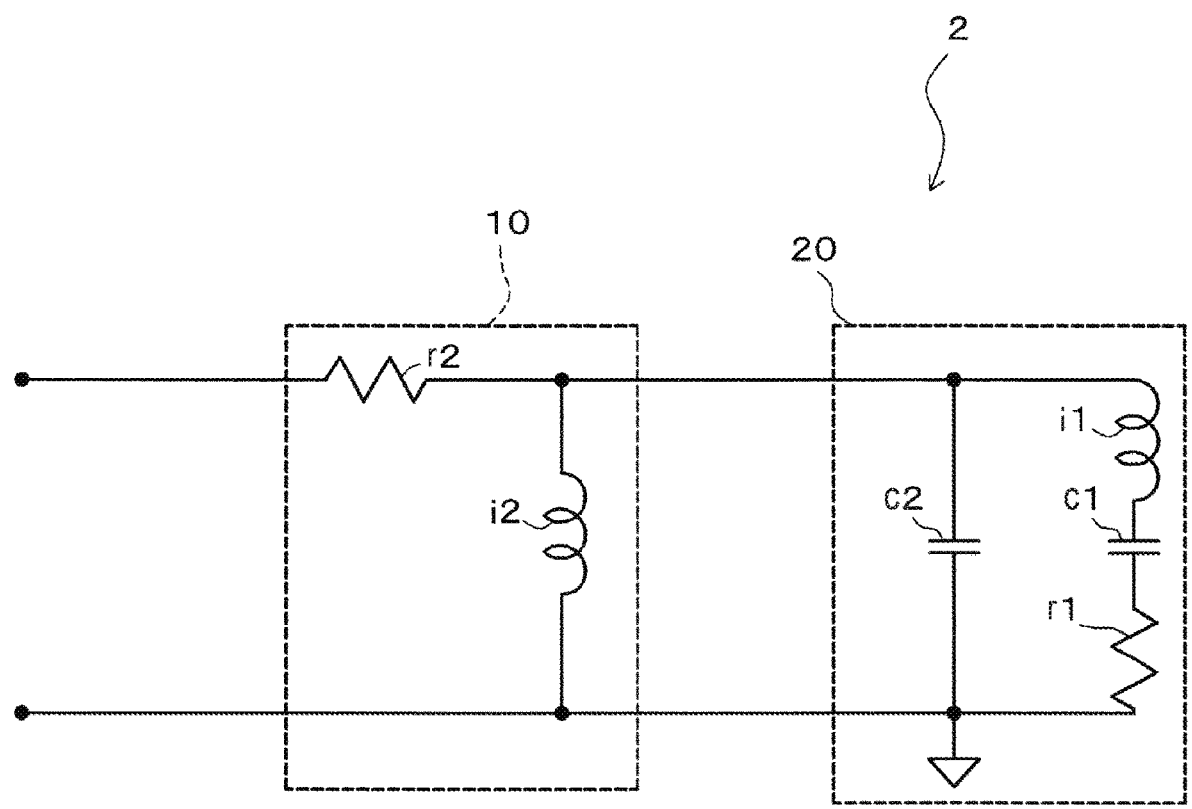
FIG. 2 is a circuit diagram of a transducer, where an oscillator is illustrated by an equivalent circuit.
Figure 3:
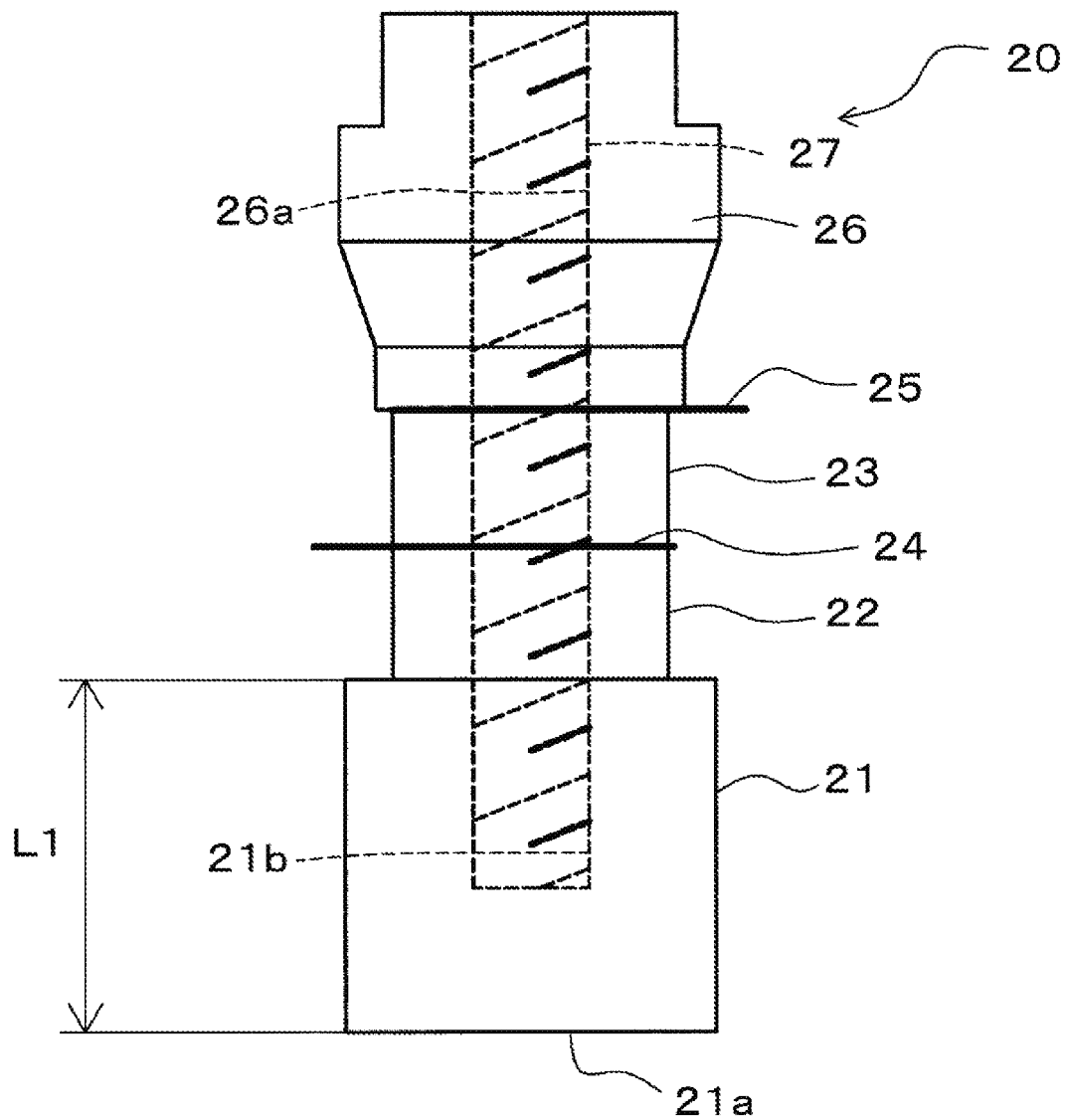
FIG. 3 is a side view of the oscillator.

FIG. 2 is a circuit diagram of the transducer 2, where the oscillator 20 is illustrated by an equivalent circuit. FIG. 3 is a side view of the oscillator 20. The oscillator 20 of this embodiment may be designed to satisfy the following characteristics, in order to realize broadbanding:

(1) A resonating point (first resonance) set when designing the broadbanded matching circuit method is a single resonance (possible to be indicated by the equivalent circuit).

(2) The SE-f characteristic (transmission sensitivity-frequency characteristic) is a gently increasing graph with an increase in the frequency.

(3) There is no large ripple and depression within a bandwidth to be broadbanded.

(4) An SE level of a second resonance does not exceed an SE level of the first resonance.

In addition, (5) the circuit constant in the broadbanded matching circuit 10 designed by the broadbanded matching circuit method is set so that it corresponds to the characteristics of the oscillator 20 which satisfies the characteristics of (1) to (4). In addition, in this embodiment, (6) the number of components of the broadbanded matching circuit 10 is kept minimum.

[Circumstances of Characteristics (1) to (6) Being Derived]

Figure 4:
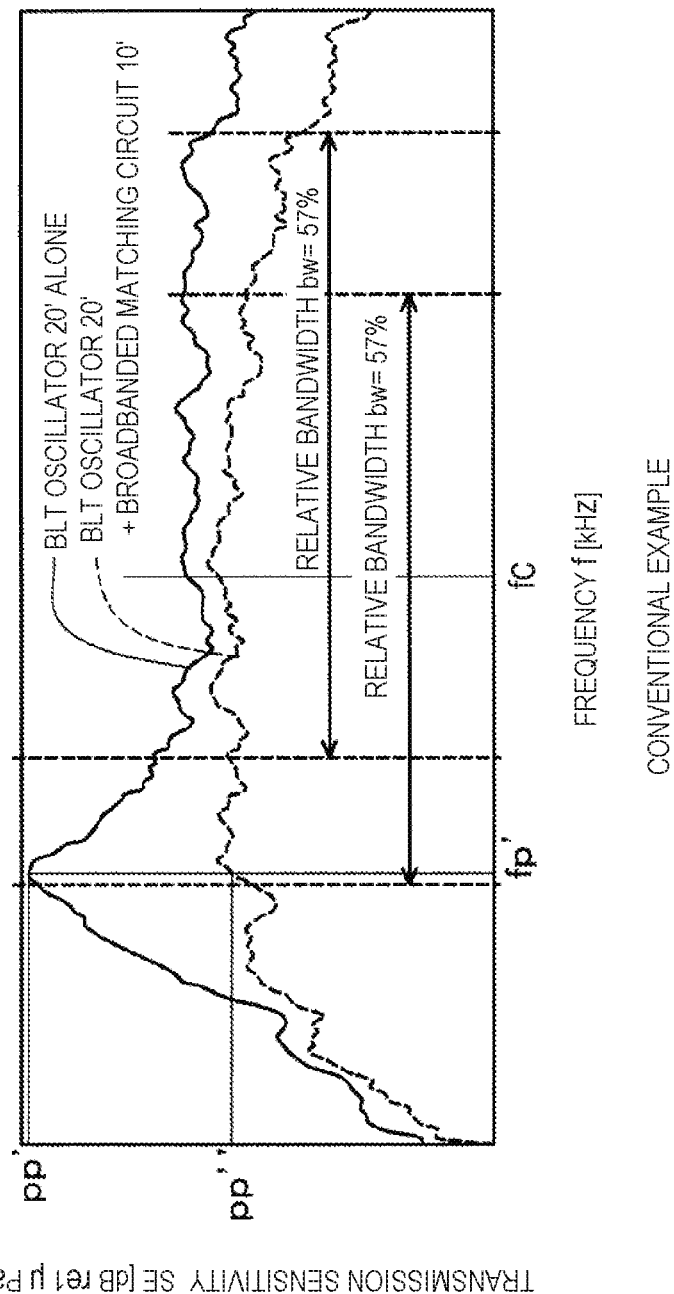
FIG. 4 is an SE-f characteristic diagram of a conventional transducer.

Next, the circumstances of the characteristics (1) to (6) being derived are described. FIG. 4 is an SE-f characteristic diagram of a conventional transducer. In FIG. 4, an SE-f characteristic is illustrated by a solid line when the broadbanding is designed with an oscillator 20' (not illustrated) alone which is a common conventional ultrasonic oscillator (without using the broadbanded matching circuit). Moreover, in FIG. 4, an SE-f characteristic of the oscillator 20' is illustrated by a dashed line, to which a broadbanded matching circuit 10' (not illustrated) created with designed values of the broadbanded matching circuit method is added.

As illustrated by the solid line in the graph of FIG. 4, in order to realize the broadbanding, the oscillator 20' may have an SE-f characteristic in which a peak transmission sensitivity pp' arises at a frequency offset from a center frequency fc, e.g., at a peak frequency fp' under the center frequency fc, and a transmission sensitivity SE then becomes substantially constant. Moreover, when the common broadbanded matching circuit 10', e.g., the broadbanded matching circuit 10' including resistance(s), inductor(s), and capacitor(s) is added to the oscillator 20', a peak transmission sensitivity pp" at the peak frequency fp' may be reduced, compared with the case of the oscillator 20' alone, as illustrated in the graph of the dashed line of FIG. 4. Thus, the SE-f characteristic may become more flat. As a result, compared with the case before the addition of the broadbanded matching circuit 10', a relative bandwidth bw after the addition of the broadbanded matching circuit 10' may seem to apparently be broader. Note that the relative bandwidth may be defined by (−3 dB attenuation width/center frequency)×100%, using a −3 dB attenuation width as a frequency bandwidth used for detecting the objects (a difference between two frequencies of the peak frequency and a frequency attenuated from the peak frequency by −3 dB).

However, in fact, as illustrated in FIG. 4, no change may be observed in the relative bandwidth bw before and after the addition of the broadbanded matching circuit 10'. As illustrated in FIG. 4, the cause may be that the SE level of the resonance frequency may drop at a higher-frequency side which is a frequency higher than the center frequency fc, as well as a drop of the SE level at a lower frequency side which is a frequency lower than the center frequency fc which is an original aim of the broadbanded matching circuit 10'. As a result, the usable −3 dB bandwidth (right end of the relative bandwidth) may shift to the lower frequency side.

Here, it is considered that the drop of the transmission sensitivity which is not expected from the design may be avoidable by increasing the number of components of the broadbanded matching circuit 10'. However, in this case, problems, such as (a) the circuit physically increases in the size by the increased number of components, and (b) the algorithm is advanced and, thus, the circuit design becomes difficult, may arise.

A configuration for broadbanding, i.e., making the relative bandwidth bw wider may be realized in this embodiment, while avoiding the problems (a) and (b).

Figure 5:
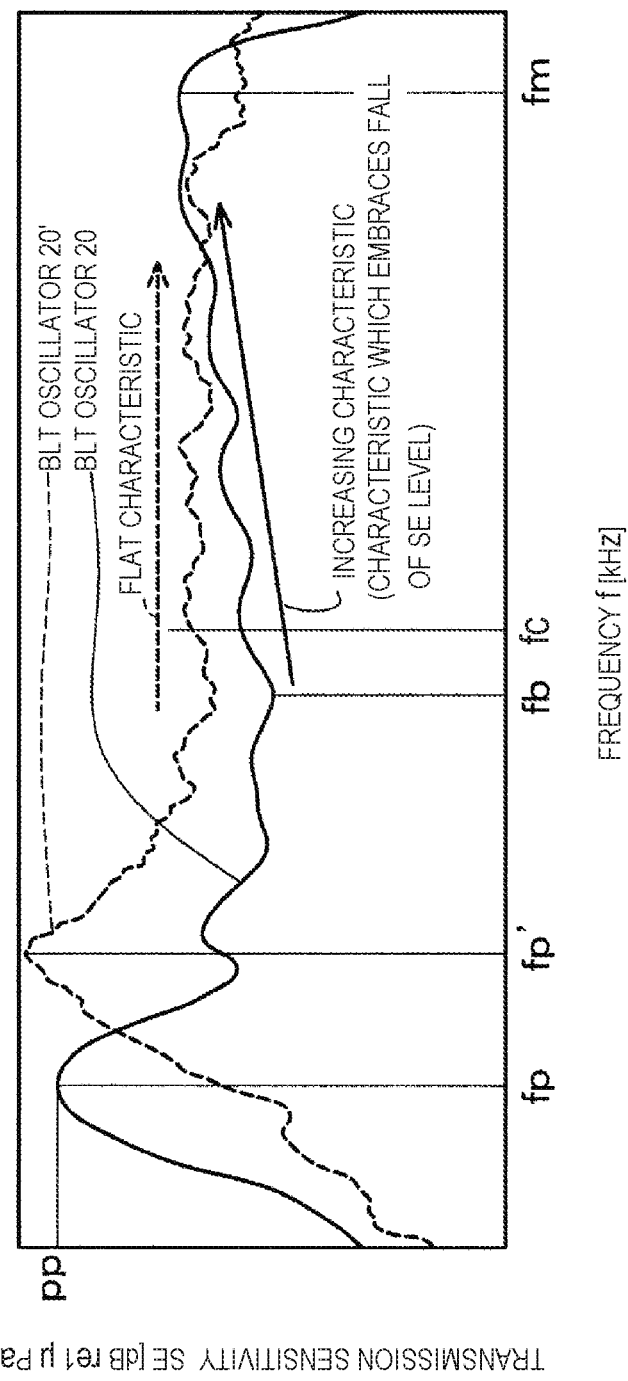
FIG. 5 illustrates, by a solid line, the SE-f characteristic when a BLT oscillator of this embodiment is used alone (when a broadbanded matching circuit is not used), and, by a dashed line, the SE-f characteristic when a conventional BLT oscillator is used alone (when the broadbanded matching circuit is not used)

In this embodiment, since the number of components of the broadbanded matching circuit 10 may be kept minimum, the combination of the oscillator 20 and the broadbanded matching circuit 10 which may have the preset increasing SE-f characteristic as illustrated in FIG. 5 may be adopted, thereby preventing the drop of the transmission sensitivity SE in the range of high frequency. Note that FIG. 5 is a view illustrating, by the solid line, the SE-f characteristic when the oscillator 20 of this embodiment is used alone (when the broadbanded matching circuit 10 is not used), and, by a dashed line, the SE-f characteristic when the conventional oscillator 20' is used alone (when the broadbanded matching circuit 10' is not used).

As illustrated in FIG. 5, the oscillator 20 may be configured so that the peak frequency fp corresponding to the peak transmission sensitivity pp may be separated from the center frequency fc in a given bandwidth, and the transmission sensitivity SE may increase as the frequency f separates from the peak frequency fp with respect to the center frequency fc. In this embodiment, the peak frequency fp of the oscillator 20 may be lower than the center frequency fc (fp<fc). Then, the transmission sensitivity SE may once drop as the frequency f goes toward the center frequency fc from the peak frequency fp. Then, the transmission sensitivity SE may increase with the increase in the frequency f, after a frequency fb between the peak frequency fp and the center frequency fc.

Note that "the transmission sensitivity SE may increase as the frequency separates from the peak frequency fp with respect to the center frequency fc" may also mean that, when a linear regression of the wave form of the transmission sensitivity SE is performed, the regression line may increase to the right in the graph. In this embodiment, the transmission sensitivity SE may decrease continuously with the increase in the frequency f after the given frequency fm higher than the center frequency fc. However, this decreasing section may be outside the meaning of "the transmission sensitivity SE may increase as the frequency separates from the peak frequency fp with respect to the center frequency fc." That is, when carrying out the linear regression of the transmission sensitivity SE, the regression line should just increase to the right in the graph and include the center frequency fc.

Figure 6:
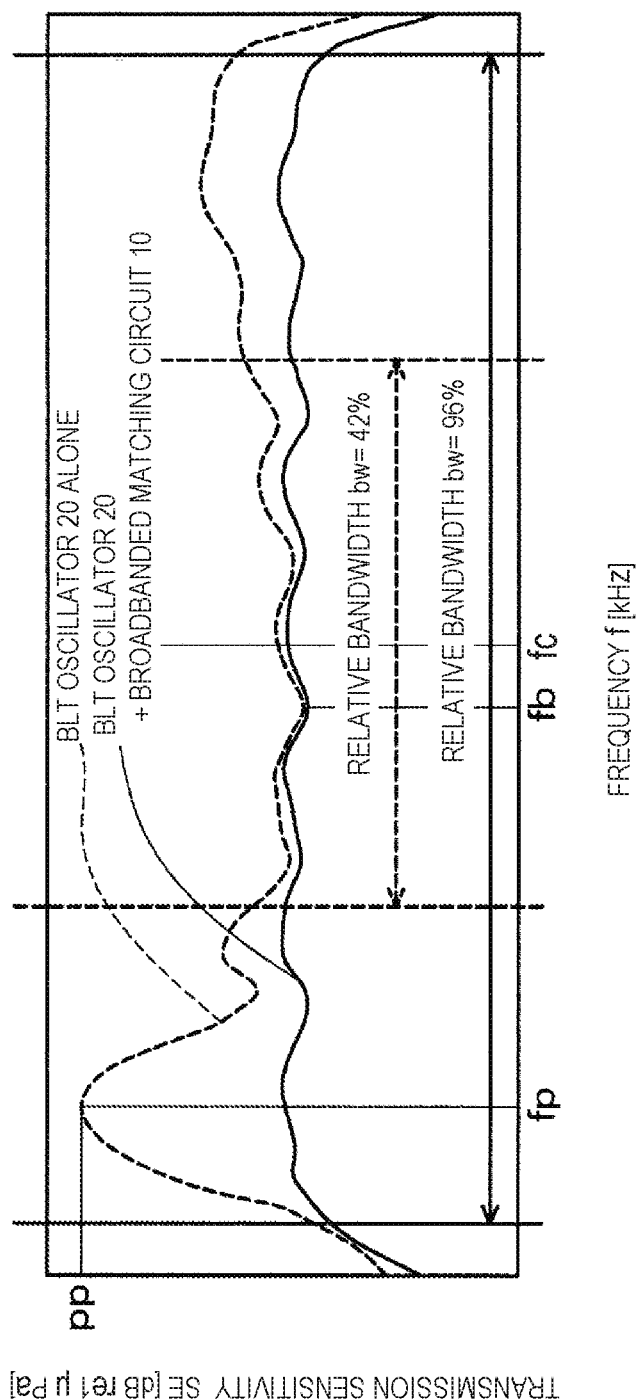
FIG. 6 is a view illustrating, by a dashed line, the SE-f characteristic of the BLT oscillator of this embodiment, and, by a solid line, the SE-f characteristic when the broadbanded matching circuit of which a circuit constant is adjusted to be applied to the BLT oscillator is added, i.e., the SE-f characteristic of the transducer.

FIG. 6 is a view illustrating, by the dashed line, the SE-f characteristic of the oscillator 20, and by the solid line, the SE-f characteristic when the broadbanded matching circuit 10 of which the circuit constant is adjusted to be applied to the oscillator 20 is added, i.e., the SE-f characteristic of the transducer 2. With reference to FIG. 6, in the SE-f characteristic of the transducer 2, the transmission sensitivity SE may fall within a range of −3 dB over a very wide range. Thus, the relative bandwidth bw may be about 96%, which exceeds well over 80%. Note that the relative bandwidth bw before the broadbanded matching circuit 10 is added to the oscillator 20 may be about 42%.

As a result of a diligent study by the present inventors, it was found that "a degree of the fall of the transmission sensitivity level outside the design frequency range (outside the relative bandwidth)" in FIG. 6 has a correlation with "a degree of the fall of the transmission sensitivity level within the design frequency range." Thus, the SE-f characteristic of the oscillator 20 is set to the increased characteristic which may embrace the fall of the level expected from the correlation. As a result, in the transducer 2 as described above, the relative bandwidth bw before the addition of the broadbanded matching circuit 10 was about 96%, while the relative bandwidth bw before the addition of the broadbanded matching circuit 10 was about 42%. Thus, in the transducer 2, the relative bandwidth bw is significantly large by the broadbanded matching circuit 10 being added. By adopting such a configuration, the relative bandwidth bw increases from about 57% to about 96%, compared with the combination of the conventional oscillator 20' and broadbanded matching circuit 10' described with reference to FIG. 4 and, thus, the relative bandwidth bw of the transducer 2 of this embodiment became significantly wider.

[Configuration of Transducer]

Next, a configuration of the transducer 2 for realizing the SE-f characteristic illustrated in FIG. 6 is described in more detail.

With reference to FIGS. 1, 2, and 3, the broadbanded matching circuit 10 of the transducer 2 may be connected to the transmission/reception switching part 6, and also connected to the oscillator 20.

[Configuration of Oscillator]

The oscillator 20 may correspond to an equivalent circuit where a capacitor c2 is connected in parallel with an RLC series circuit where a resistance (which may also be referred to as "resistance value") r1, an inductor (which may also be referred to as "inductor value") i1, and a capacitor c1 is connected in series.

The oscillator 20 may have a front mass 21 as an oscillating part, two piezo-electric elements 22 and 23, a pair of electrode plates 24 and 25, a tail mass 26, and a clamp bolt 27.

The oscillator 20 may be provided as a Bolt-clamped Langevin Type oscillator (BLT oscillator) where the front mass 21, the piezo-electric elements 22 and 23, and the tail mass 26 may be mutually fixed by the bolt clamp. The oscillator 20 may be formed in a pillar shape as a whole, and have a configuration in which the front mass 21, the piezo-electric element 22, the electrode plate 24, the piezo-electric element 23, the electrode plate 25, and the tail mass 26 may be arranged in this order in the axial directions of the oscillator 20. In the oscillator 20, a side at which the front mass 21 is disposed may be a tip-end side, while a side at which the tail mass 26 is disposed is a base-end side.

The front mass 21 may be, for example, a block-shaped member made of a metal material, such as a structure material. The front mass 21 may be, for example, formed in a cylindrical shape. A tip-end surface of the front mass 21 may include a transmission/reception surface 21a from/to which the ultrasonic wave is transmitted and received. The diameter of the transmission/reception surface 21a may be, for example, about 26 mm. Note that the shape of the front mass 21 is not limited to the shapes described above, but it may be a truncated cone tapered shape where the diameter increases as it goes to the tip-end side, or may be a square pillar shape or other shapes.

The two piezo-electric elements 22 and 23 may be formed in annular shapes of which the outer diameters and thicknesses may substantially be the same, and configured to expand and contract by voltage applied externally so that they may vibrate in the axial directions. The two piezo-electric elements 22 and 23 may mutually be stacked in a coaxial manner. The tip-end surface of one piezo-electric element 22 may contact a base-end surface of the front mass 21. The electrode plate 24 may be inserted into a space between a base-end surface of one piezo-electric element 22 and a tip-end surface of the other piezo-electric element 23. The electrode plate 24 may be formed in a substantially annular shape, and have a configuration in which a terminal piece may be formed in an outer circumferential part. The electrode plate 25 may be inserted into a space between a base-end surface of the other piezo-electric element 23 and a tip-end surface of the tail mass 26. The electrode plate 25 may be formed in a substantially annular shape, and have a configuration in which a terminal piece may be formed in an outer circumferential part.

In this embodiment, the tail mass 26 may be formed in a block shape. A tip-end part of the tail mass 26 may be formed in a cylindrical shape. Moreover, an intermediate part of the tail mass 26 may be formed in a truncated cone shape of which the outer diameter increases as it goes away from the piezo-electric element 23. Moreover, a base-end side part of the tail mass 26 may be formed in a shape in which a part of the outer circumferential part of the cylindrical shape is notched. The tail mass 26 may be, for example, made of metal, such as stainless steel (SUS). A tip-end surface of the tail mass 26 may closely contact the electrode plate 25.

The clamp bolt 27 may be configured to give a compressive stress to the piezo-electric elements 22 and 23 by fastening the front mass 21 and the tail mass 26 together. The clamp bolt 27 may threadedly engage with an internally-threaded part 21b formed inside the front mass 21 and penetrate the inside of the piezo-electric element 22, the electrode plate 24, the piezo-electric element 23, and the electrode plate 25, and further threadedly engage with an internally-threaded part 26a formed inside the tail mass 26.

In this embodiment, in order to satisfy the characteristics (1) to (4) described above, an original configuration may be adopted particularly by the front mass 21 in the oscillator 20. For example, the weight of the front mass 21 may be less than the weight of the tail mass 26. For example, the weight of the front mass 21 may be reduced by making at least one of the density and the volume of the material which constitutes the front mass 21 less than the corresponding density and volume of the material which constitutes the tail mass 26.

Moreover, in this embodiment, the full length L1 of the front mass 21 may be set so that the peak transmission sensitivity pp occurs at the peak frequency fp which is separated from the center frequency fc, and it becomes the characteristic in which the transmission sensitivity SE may increase as the frequency f changes so as to be separated from the peak frequency fp with respect to the center frequency fc. Here, a virtual oscillator may be assumed, which has the same configuration as the oscillator 20, except for the full length of the front mass. The peak frequency of the virtual oscillator may substantially be the same as the center frequency fc. The full length L1 of the front mass 21 of the oscillator 20 may be set longer than the full length of the front mass in such a virtual oscillator.

As described above, for example, at least one of configurations (in this embodiment, both the configurations) of making the weight of the front mass 21 less than the weight of the tail mass 26, and setting the length L1 of the front mass 21 longer, may be adopted. Thus, the oscillator 20 may be capable of realizing the SE-f characteristics illustrated in FIGS. 5 and 6.

[Configuration of Broadbanded Matching Circuit]

With reference to FIGS. 2 and 6, the broadbanded matching circuit 10 may be provided in order to reduce the variation in the output of the oscillator 20 corresponding to the change in the frequency f. More specifically, the broadbanded matching circuit 10 may be broadbanded by lowering the transmission sensitivity SE at the peak frequency fp of the oscillator 20. Moreover, the broadbanded matching circuit 10 may form an antiresonance point in the impedance-frequency characteristic; however, the transmission sensitivity SE of the oscillator 20 may not be affected at the antiresonance point.

In this embodiment, the broadbanded matching circuit 10 may be comprised of the resistance r2 which is connected in series to the oscillator 20, and the inductor i2 which is connected in parallel with the oscillator 20. The broadbanded matching circuit 10 may aim at broadening the bandwidth. For this reason, a capacitor for adjusting the bandwidth may not be provided in the broadbanded matching circuit 10.

The resistance (which may also be referred to as "resistance value") r2 may be installed between one of terminals of the transmission/reception switching part 6 and one of terminals of the oscillator 20 to adjust the transmission sensitivity SE of the oscillator 20. The transmission sensitivity SE of the oscillator 20 may be set at each frequency f by setting the circuit constant of the resistance r2. The resistance value of the resistance r2 is larger than the resistance value of the resistance r1 of the equivalent circuit (which is illustrated by the equivalent circuit in FIG. 2) corresponding to the oscillator 20. In addition, the resistance value of the resistance r2 is set to adjust the transmission sensitivity SE within a given attenuation width such as for example a range of −3 dB.

The inductor (which may also be referred to as "inductor value") i2 may be provided in order to set the impedance-frequency characteristic. In the broadbanded matching circuit 10, the circuit constant may be set so that the peak (antiresonance point) of the impedance-frequency characteristic may occur at a frequency higher than the center frequency fc. Thus, the variation in the transmission sensitivity SE at the frequency f higher than the peak frequency fp may be reduced. The inductor value of the inductor i2 is smaller than the inductor value of the inductor i1 of the equivalent circuit (which is illustrated by the equivalent circuit in FIG. 2) corresponding to the oscillator. In addition, the inductor value of the inductor i2 is set to adjust the transmission sensitivity SE within a given attenuation width such as for example a range of −3 dB.

Moreover, by the combination of the resistance r2 and the inductor i2, the broadbanded matching circuit 10 may perform the impedance matching so that the transmission sensitivity SE of the oscillator 20 at the peak frequency fp may become substantially equal to the transmission sensitivity SE of the oscillator 20 at the center frequency fc. Note that "substantially equal" in this case means that, for example, a value of larger one of the transmission sensitivity SE of the oscillator 20 at the peak frequency fp and the transmission sensitivity SE of the oscillator 20 at the center frequency fc may be used as a reference, and a value of the lower one may fall within a range of minus several decibels of the higher value. The "minus several decibels" may include, for example, values of −3 dB, −2 dB, and −1 dB.

With this configuration, the peak of the transmission sensitivity SE of the oscillator 20 may be lowered to achieve the broadbanding by consuming the electric power at the frequency where the transmission sensitivity SE is high, by the resistance r2 of the broadbanded matching circuit 10. In this embodiment, the antiresonance point may be provided at the frequencies around the peak frequency fp to increase the impedance at the antiresonance point. Note that, at the antiresonance point, the transmission sensitivity SE may not change, regardless of the existence of the resistance r2.

By providing the oscillator 20 and the broadbanded matching circuit 10 which may have the above configuration, the SE-f characteristic of the ultrasonic wave from the oscillator 20 may be the characteristic illustrated by the solid line in FIG. 6, as described above. That is, the characteristic with the significantly broad bandwidth may be realized, where the relative bandwidth bw is about 96%.

[Effects]

As described above, according to this embodiment, in the transducer 2, the oscillator 20 may be set so that the peak frequency fp corresponding to the peak transmission sensitivity pp separates from the center frequency fc in a given bandwidth, and the transmission sensitivity SE may become high as the frequency f separates from the peak frequency fp with respect to the center frequency fc. Moreover, the broadbanded matching circuit 10 may perform the impedance matching so that the transmission sensitivity SE of the oscillator 20 at the peak frequency fp becomes substantially equal to the transmission sensitivity SE of the oscillator 20 at the center frequency fc. According to this configuration, the variation in the transmission sensitivity SE of the transducer 2 may be reduced within the large frequency range including the center frequency fc. As a result, the relative bandwidth bw may be made broader.

Moreover, according to this embodiment, the broadbanded matching circuit 10 may not include the capacitor. According to this configuration, the broadbanded matching circuit 10 may be realized with the smaller number of components, while realizing the broadbanding to the maximum extent in the broadbanded matching circuit 10. As a result, the reliable, small, and low-cost broadbanded matching circuit 10 may be realized.

Moreover, according to this embodiment, the peak frequency fp of the oscillator 20 may be set lower than the center frequency fc. According to this configuration, the setting of the peak frequency fp which may be suitable for the oscillator 20 having the single peak frequency fp can be performed. In other words, the degree to improve the existing BLT oscillator in order to design the oscillator 20 may be reduced.

Moreover, according to this embodiment, the weight of the front mass 21 may be less than the weight of the tail mass 26. By this configuration, the SE-f characteristic of the oscillator 20 may be set so that the transmission sensitivity SE may increase as the frequency f increases from the peak frequency fp with respect to the center frequency fc.

Moreover, according to this embodiment, the full length L1 of the front mass 21 may be set so that the peak transmission sensitivity pp may occur at the peak frequency fp, and the characteristic may be attained so that the transmission sensitivity SE may increase as the frequency changes so that the frequency may separate from the peak frequency fp with respect to the center frequency fc. Thus, with the simple configuration of suitably setting the full length L1 of the front mass 21, the SE-f characteristic of the oscillator 20 may be optimized as illustrated in FIG. 6.

[Modifications]

Although the embodiment of the present disclosure is described above, the present disclosure is not limited to the embodiment and various changes may be possible without departing from the scope of the present disclosure.

Figure 7:
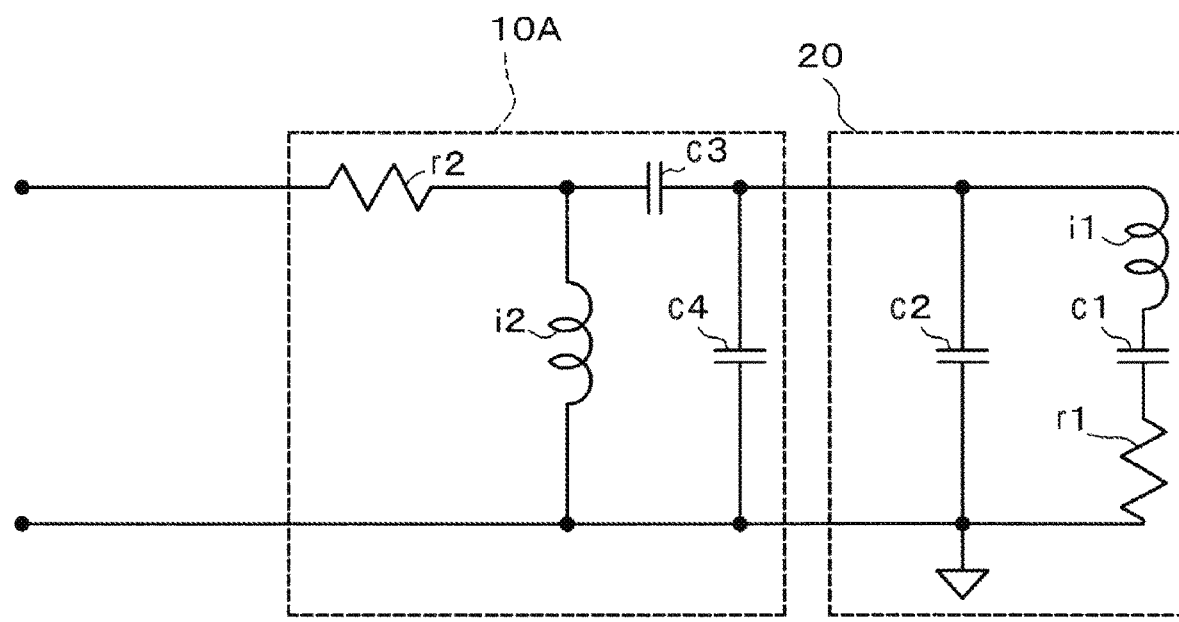
FIG. 7 is a view illustrating one modification.

(1) In the above embodiment, the form in which a capacitor may not be provided to the broadbanded matching circuit 10 is described as one example. However, the present disclosure may not be configured as described above. For example, as illustrated in FIG. 7, instead of the broadbanded matching circuit 10, a broadbanded matching circuit 10A including capacitors c3 and c4 may be used. The broadbanded matching circuit 10A may correspond to a configuration in which the capacitors c3 and c4 are added to the broadbanded matching circuit 10. The capacitor c3 may be installed between one end of the inductor i2 and one end of the oscillator 20, and may be connected in series to the oscillator 20. The capacitor c4 may be connected in parallel with the inductor i2 and the oscillator 20. The bandwidth bw may be set by setting the circuit constant of the capacitors c3 and c4. The resistance value of the resistance r2 may be larger than the resistance value of the resistance r1 of the equivalent circuit (which is illustrated by the equivalent circuit in FIG. 7) corresponding to the oscillator 20. In addition, the resistance value of the resistance r2 may be set to adjust the transmission sensitivity SE within a given attenuation width such as for example a range of −3 dB. The inductor value of the inductor i2 may be smaller than the inductor value of the inductor i1 of the equivalent circuit (which is illustrated by the equivalent circuit in FIG. 7) corresponding to the oscillator 20. In addition, the inductor value of the inductor i2 may be set to adjust the transmission sensitivity SE within a given attenuation width such as for example a range of −3 dB.

According to this modification, the broadbanded matching circuit 10A may be comprised of the resistance r2 and the capacitor c3 which are connected in series with the oscillator 20, and the inductor i2 and the capacitor c4 which are connected in parallel with the oscillator 20. According to this configuration, since the broadbanded matching circuit 10A may be realized by a configuration close to the configuration of the known broadbanded matching circuit, the cost required for producing the broadbanded matching circuit 10A may be less.

(2) Moreover, in the above embodiment, the oscillator 20 may be configured so that the peak transmission sensitivity pp occurs at the peak frequency fp set to the frequency smaller than the center frequency fc, and the transmission sensitivity SE increases as the frequency f increases with respect to the center frequency fc. However, the present disclosure may not be configured as described above. For example, an oscillator having characteristics contrary to the characteristics of the oscillator 20 may be used. That is, the oscillator configured so that the peaking capacity may occur at the peak frequency set to the frequency larger than center frequency, and the transmission sensitivity may increase as the frequency f decreases with respect to the center frequency, may be used. According to this configuration, the SE-f characteristic suitable for the case where an oscillator other than the BLT oscillator, for example, the oscillator having a plurality of resonance modes is used may be realized. Note that, even in this case, the broadbanded matching circuit may be configured so that the transmission sensitivity of the oscillator at the peak frequency may be lower than the transmission sensitivity of the oscillator at the center frequency.

(3) Moreover, the present disclosure may be applicable to oscillators other than the BLT oscillator.

(4) Moreover, in the above embodiment, the form with which one oscillator 20 may be provided to the transducer 2 is described as one example. However, the present disclosure may not be configured as described above. For example, the present disclosure may be applied to a transducer having an arrayed oscillator where a plurality of oscillators may be arrayed.

(5) Moreover, in the above embodiment and modifications, the example in which the transducer 2 may be applied to the underwater detection device 1 which detects the underwater target object is described. However, the present disclosure may not be configured as described above. The present disclosure may be applied to other devices having the transducer (ultrasonic diagnostic device etc.).

The present disclosure may widely be applicable as a transducer.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controlling module, microcontrolling module, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controlling module, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow views described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein are preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A transducer, comprising:
   an oscillator of which a peak frequency corresponding to a peak transmission sensitivity separates from a center frequency in a given bandwidth, and a transmission sensitivity increases as a frequency separates from the peak frequency with respect to the center frequency; and
   a broadbanded matching circuit configured to perform an impedance matching so that the transmission sensitivity of the oscillator at the peak frequency becomes substantially equal to the transmission sensitivity of the oscillator at the center frequency.

2. The transducer of claim 1, wherein the broadbanded matching circuit is comprised of a resistance connected in series with the oscillator, and an inductor connected in parallel with to the oscillator.

3. The transducer of claim 1, wherein the broadbanded matching circuit is comprised of a resistance and a capacitor that are connected in series with the oscillator, and an inductor and a capacitor that are connected in parallel with the oscillator.

4. The transducer of claim 1, wherein the peak frequency of the oscillator is set lower than the center frequency.

5. The transducer of claim 1, wherein the oscillator is a BLT oscillator including a tail mass, and a front mass as an oscillating part.

6. The transducer of claim 5, wherein the weight of the front mass is less than the weight of the tail mass.

7. The transducer of claim 2, wherein the peak frequency of the oscillator is set lower than the center frequency.

8. The transducer of claim 3, wherein the peak frequency of the oscillator is set lower than the center frequency.

9. The transducer of claim 2, wherein the oscillator is a BLT oscillator including a tail mass, and a front mass as an oscillating part.

10. The transducer of claim 3, wherein the oscillator is a BLT oscillator including a tail mass, and a front mass as an oscillating part.

11. The transducer of claim 4, wherein the oscillator is a BLT oscillator including a tail mass, and a front mass as an oscillating part.

12. The transducer of claim 2, wherein a resistance value of the resistance connected in series with the oscillator is larger than a resistance value of a resistance of an equivalent circuit corresponding to the oscillator.

13. The transducer of claim 12, wherein the resistance value of the resistance connected in series with the oscillator is set to adjust the transmission sensitivity within a given attenuation width.

14. The transducer of claim 2, wherein an inductor value of the inductor connected in parallel with to the oscillator is smaller than an inductor value of an inductor of an equivalent circuit corresponding to the oscillator.

15. The transducer of claim 14, wherein the inductor value of the inductor connected in parallel with to the oscillator is set to adjust the transmission sensitivity within a given attenuation width.

16. The transducer of claim 3, wherein a resistance value of the resistance connected in series with the oscillator is larger than a resistance value of a resistance of an equivalent circuit corresponding to the oscillator.

17. The transducer of claim 16, wherein the resistance value of the resistance connected in series with the oscillator is set to adjust the transmission sensitivity within a given attenuation width.

18. The transducer of claim 3, wherein an inductor value of the inductor connected in parallel with to the oscillator is smaller than an inductor value of an inductor of an equivalent circuit corresponding to the oscillator.

19. The transducer of claim 18, wherein the inductor value of the inductor connected in parallel with to the oscillator is set to adjust the transmission sensitivity within a given attenuation width.

* * * * *